H. N. MOTSINGER.
COUPLING FOR CARBURETERS.
APPLICATION FILED JAN. 29, 1914.
1,113,570.
Patented Oct. 13, 1914.
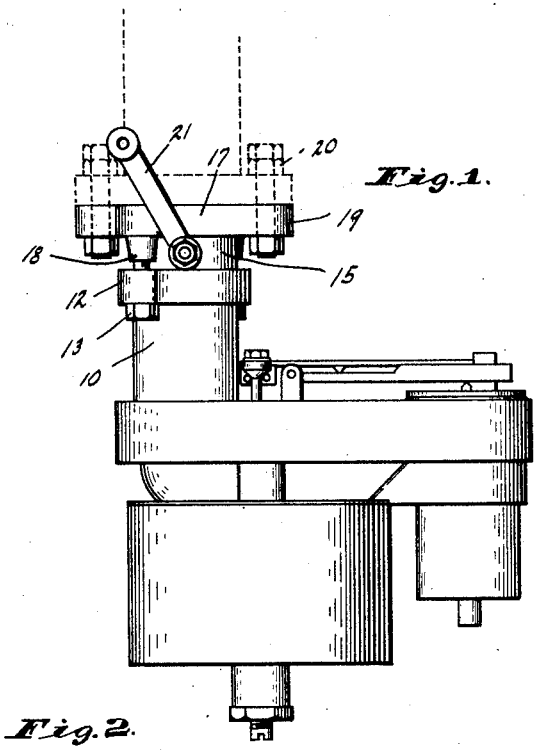
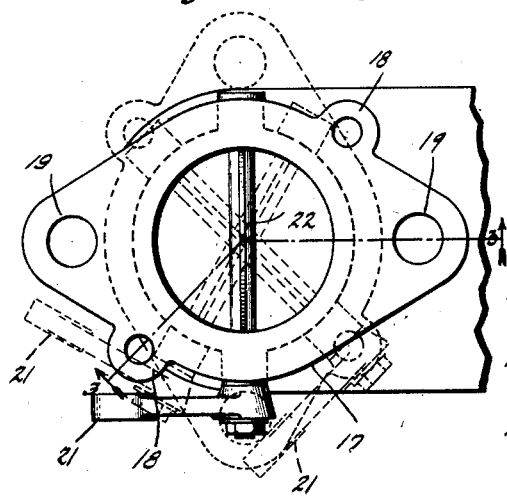
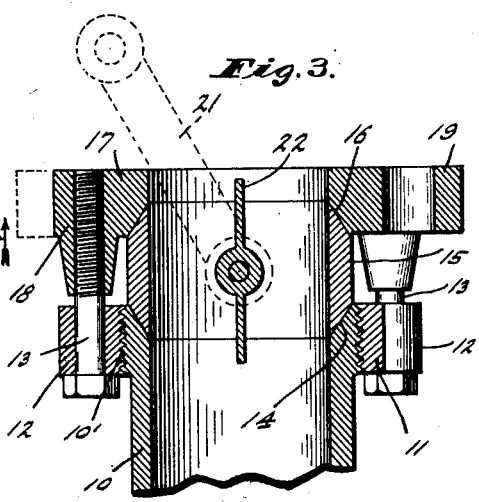
WITNESSES:
Frank A. Fahle
Josephine Gasper
INVENTOR
Homer N. Motsinger,
BY
Arthur M. Hood
ATTORNEY

UNITED STATES PATENT OFFICE.

HOMER N. MOTSINGER, OF LA FAYETTE, INDIANA, ASSIGNOR TO MOTSINGER DEVICE MANUFACTURING COMPANY, OF LA FAYETTE, INDIANA, A CORPORATION OF INDIANA.

COUPLING FOR CARBURETERS.

1,113,570.  Specification of Letters Patent.  Patented Oct. 13, 1914.

Application filed January 29, 1914. Serial No. 815,157.

*To all whom it may concern:*

Be it known that I, HOMER N. MOTSINGER, a citizen of the United States, residing at La Fayette, in the county of Tippecanoe and State of Indiana, have invented a new and useful Coupling for Carbureters, of which the following is a specification.

The object of my invention is to provide a coupling construction by means of which a carbureter of any desired type may be readily attached to any make of automobile or other structure so as to be most conveniently placed for care and manipulation and so that its throttle valve may be most conveniently placed for connection with its operating member at the driver's seat.

The accompanying drawings illustrate my invention.

Figure 1 is a side elevation of a carbureter equipped with my improved coupling; Fig. 2 a plan of the coupling and adjacent body of the carbureter; Fig. 3 a section on line 3—3 of Fig. 2.

In the drawings, 10 indicates the main body of the carbureter provided with a coupling head 11 which commonly embodies two diametrically opposed radially projecting ears 12, 12, perforated to receive common fastening bolts 13. Head 11 is threaded at 10' upon the main body 10 so that the main body may be readily turned relative to the head. A conical seat 14 is provided at the upper end of the body 10 and in this is seated the lower conical end of a valve-carrying ring 15. The upper end of ring 15 is also coniform so as to seat in the conical seat 16 of a coupling head 17 which, in general form, is similar to the head 11 except that it is not internally threaded. Head 17 is provided with threaded ears 18, 18 adapted to receive the bolts 13, 13 and is also provided with diametrically opposed perforated ears 19, 19 through which may be passed the usual fastening bolts indicated by dotted lines at 20 (Fig. 1) for attaching the carbureter to the inlet manifold of the engine. By this arrangement the head 17 is readily attachable to the flange commonly provided at the inlet end of the inlet manifold no matter how this flange may happen to be placed in the machine. Thereupon, by loosening the bolts 13 slightly, the main body of the carbureter may be readily swung in the threaded connection 10' so as to occupy any desired position and at the same time the throttle valve ring may be rotated so as to bring the operating arm 21 of a throttle valve 22 into the most convenient position for extending a connection therefrom to the operating levers on the steering head. When these various adjustments have been accomplished, as they may by even a comparatively unskilled person, the bolts 13, 13 may be tightened thus firmly clamping the throttle valve ring in place and also locking the threaded connection between the main body of the carbureter and the head 11.

I claim as my invention:

1. The combination with a carbureter main body of a coupling head having a rotative connection with said main body, a second coupling head adapted for attachment to an inlet manifold, a portion forming a strut between said second coupling and the carbureter body, and bolts connecting said two coupling heads in such manner that tightening of the bolts will place the rotative connection between the first-mentioned coupling head and the carbureter body under a restraining friction.

2. The combination of a carbureter, a coupling head having a rotative connection with the main body of the carbureter, a second coupling head formed for attachment to an inlet manifold, bolts connecting the two coupling heads, and a throttle-valve-ring rotatably seated between the main body of the carbureter and the second coupling head whereby the carbureter and throttle-valve-ring may be rotatably adjusted relative to the second coupling head and clamped in position by the connecting bolts.

In witness whereof I have hereunto set my hand at Indianapolis, Indiana, this 23rd day of January, A. D. one thousand nine hundred and fourteen.

HOMER N. MOTSINGER.

Witnesses:
ARTHUR M. HOOD,
FRANK A. FAHLE.

Copies of this patent may be obtained for five cents each, by addressing the "Commissioner of Patents, Washington, D. C."